US008835782B2

(12) United States Patent
Fischer-Carne et al.

(10) Patent No.: US 8,835,782 B2
(45) Date of Patent: Sep. 16, 2014

(54) CONTACT ARM ASSEMBLY FOR SWITCHGEAR CIRCUIT BREAKER HAVING IMPROVED COOLING FINS AND CONTACT FINGERS TO MAXIMIZE HEAT REJECTION

(75) Inventors: Patrick R. Fischer-Carne, New Smyrna Beach, FL (US); Robert S. Karnbach, Lake Mary, FL (US); Rahul Pawar, Lake Mary, FL (US)

(73) Assignee: ABB Technology AG, Zurich (CH)

( * ) Notice: Subject to any disclaimer, the term of this patent is extended or adjusted under 35 U.S.C. 154(b) by 230 days.

(21) Appl. No.: 13/615,827

(22) Filed: Sep. 14, 2012

(65) Prior Publication Data

US 2013/0075238 A1 Mar. 28, 2013

Related U.S. Application Data

(60) Provisional application No. 61/537,624, filed on Sep. 22, 2011.

(51) Int. Cl.
*H01H 1/06* (2006.01)
*H01H 9/52* (2006.01)
*H01H 1/62* (2006.01)
*H01H 1/38* (2006.01)

(52) U.S. Cl.
CPC . *H01H 9/52* (2013.01); *H01H 1/62* (2013.01); *H01H 1/38* (2013.01)
USPC .......................................... 200/279; 439/848

(58) Field of Classification Search
USPC ......... 200/279, 275, 276, 239, 245, 246, 248, 200/249; 439/848, 821, 822, 487, 485, 489
See application file for complete search history.

(56) References Cited

U.S. PATENT DOCUMENTS

| 3,662,137 | A | * | 5/1972 | Cleaveland | 200/289 |
| 4,110,580 | A | * | 8/1978 | Farish | 218/85 |
| 4,517,425 | A | * | 5/1985 | Martin | 218/66 |
| 4,594,489 | A | * | 6/1986 | Gengenbach et al. | 218/117 |
| 5,025,121 | A | * | 6/1991 | Allen et al. | 200/275 |
| 6,744,001 | B2 | * | 6/2004 | Dufournet et al. | 218/66 |
| 6,902,413 | B1 | * | 6/2005 | Moga | 439/125 |
| 8,613,626 | B1 | * | 12/2013 | Phan | 439/181 |
| 2008/0045091 | A1 | * | 2/2008 | Hughes | 439/848 |
| 2013/0267115 | A1 | * | 10/2013 | Mark | 439/485 |

* cited by examiner

*Primary Examiner* — Kyung Lee
(74) *Attorney, Agent, or Firm* — Manelli Selter PLLC; Edward J. Stemberger

(57) ABSTRACT

A contact arm assembly (10) for a switchgear circuit breaker includes a contact arm (11) having a groove (42) in an outer periphery surface thereof. At least one contact finger (13) has a body (38) and a ball member (40) extending from the body. The ball member is received in the groove so that the contact finger makes contact with the contact arm. The contact arm includes a shaft (14) having a longitudinal axis, first and second ends (18, 28), and a constant outside diameter. A plurality of annular rings (16) extends from the outside diameter of the shaft. The rings are spaced along the longitudinal axis to define cooling fins. Diameters of the rings gradually decrease from the first end to generally the center of the shaft, and then gradually increase to the second end of the shaft.

19 Claims, 2 Drawing Sheets

CONTACT ARM ASSEMBLY FOR SWITCHGEAR CIRCUIT BREAKER HAVING IMPROVED COOLING FINS AND CONTACT FINGERS TO MAXIMIZE HEAT REJECTION

This application claims priority from U.S. Provisional Application No. 61/537,624, filed on Sep. 22, 2011.

FIELD

The invention relates to switchgear circuit breakers and, more particularly, to a contact arm assembly thereof that has improved cooling fins for convective heat rejection and improved contact fingers that maximize heat rejection surface areas.

BACKGROUND

The contact arms of a switchgear circuit breaker are used to connect the circuit breaker to the contacts of a circuit breaker truck assembly. The contact arms normally include annular rings disposed in spaced relation for convective heat rejection. These rings are typically of the same outer diameter, maximized to pass ANSI Heat Rise test requirements. These constant diameter rings may cause problems with ANSI BIL (Basic Impulse Level) testing requirements and may force the use of current transformers with Mylar® liners and polycarbonate barriers to prevent flashover to grounded surfaces and equipment. The constant diameter rings may cause high electrostatic field stresses and shorter flashover path lengths to grounded objects in the final switchgear assembly.

In additional, the contact area of high amperage circuit breakers and switchgear contact fingers are a source of heat and temperature rise test failures.

Thus, there is a need to provide improved annular rings on a contact arm and to provide improved contact fingers for convective heat rejection.

SUMMARY

An object of the invention is to fulfill the need referred to above. In accordance with the principles of an embodiment, this objective is achieved by providing a contact arm assembly for a switchgear circuit breaker. The assembly includes a contact arm having a groove in an outer peripheral surface thereof. At least one contact finger has a body and a ball member extending from the body. The ball member is received in the groove so that the contact finger makes contact with the contact arm.

In accordance with another aspect of an embodiment, a contact arm for a switchgear circuit breaker includes a shaft having a longitudinal axis, first and second ends, and a substantially constant outside diameter. A plurality of annular rings extends from the outside diameter of the shaft. The rings are spaced along the longitudinal axis to define cooling fins. Diameters of the rings gradually decrease from the first end to generally the center of the shaft, and then gradually increasing to the second end of the shaft.

In accordance with yet another aspect of an embodiment, a method of providing a heat rejecting contact arm assembly for a switchgear circuit breaker provides a contact arm having a shaft with a longitudinal axis. The shaft has first and second ends, and a substantially constant outside diameter. A plurality of annular rings extends from the outside diameter of the shaft. The rings are spaced along the longitudinal axis to define cooling fins. Diameters of the rings gradually decrease from the first end to generally the center of the shaft, and then gradually increase to the second end of the shaft. A groove is provided in the periphery of the shaft. The contact arm is assembled in a bushing structure such that the center of the shaft is disposed generally at an inlet end of the bushing structure. A contact finger is provided to have a body and a ball member extending from the body. The ball member is received in the groove so that the contact finger makes contact with the contact arm.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which.

DETAILED DESCRIPTION OF THE EXEMPLARY EMBODIMENTS

Figure 1:
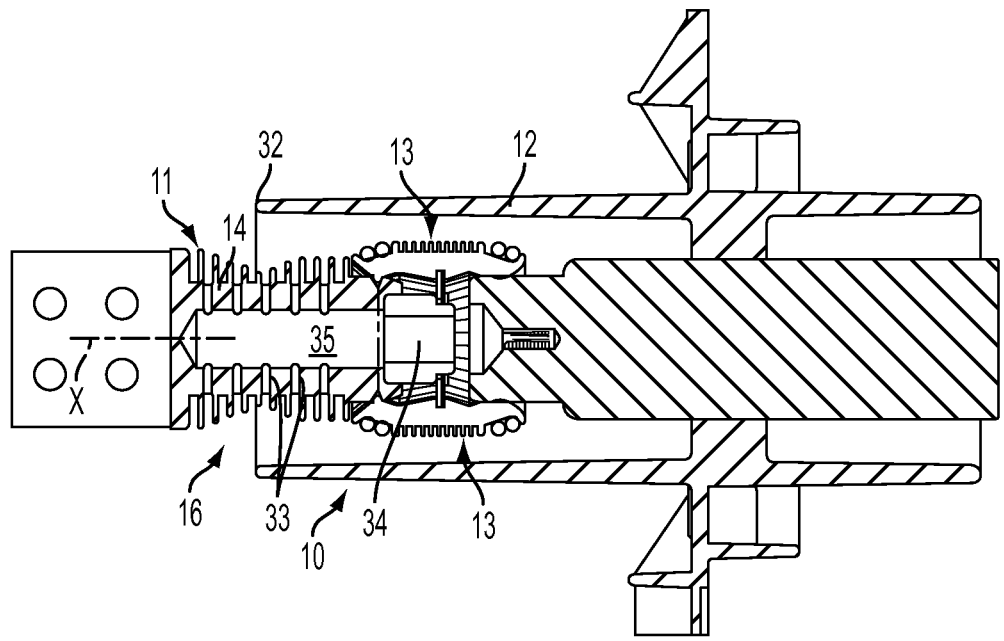
FIG. 1 is a side, sectional view of a contact arm assembly of a switchgear circuit breaker, provided in accordance with an embodiment.

With reference to FIG. 1, a contact arm assembly of a switchgear circuit breaker, is shown, generally indicated at 10, in accordance with an embodiment of the invention. The contact arm assembly 10 includes a contact arm, generally indicated at 11, mounted in a bushing structure 12, and contact fingers 13 associated with the contact arm 11.

Figure 2:
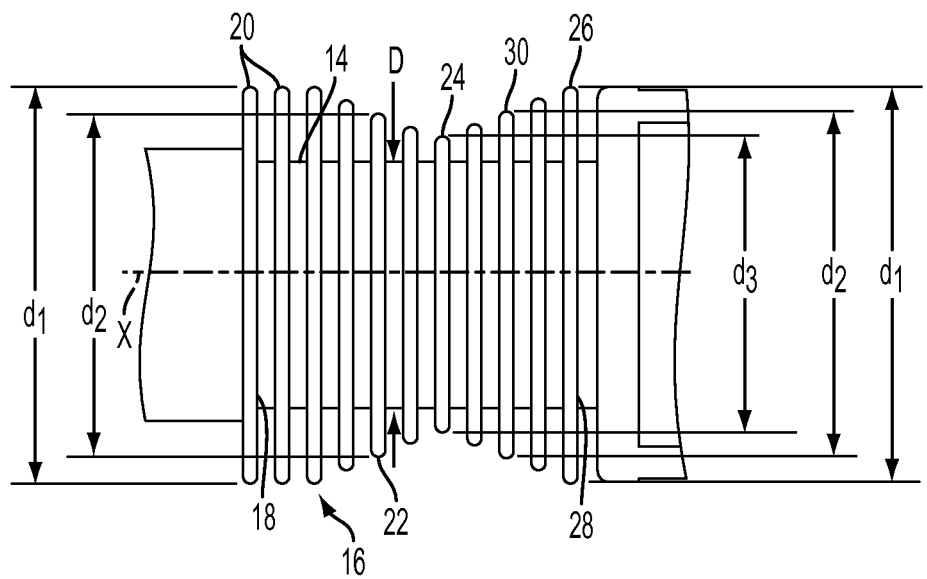
FIG. 2 is an enlarged side view of the annular rings of a contact arm of the contact arm assembly of FIG. 1.

As best shown in FIG. 2, the contact arm 11 includes a hollow shaft 14 of substantially constant outer diameter D. A plurality of solid annular rings, generally indicated at 16, extend from the outer diameter D in spaced relation along the longitudinal axis X of the shaft 14. At one end 18 of the shaft 14, at least one of the rings 20 has a diameter $d_1$. A ring 22, spaced axially from ring 20 has a diameter $d_2$ that is less than diameter $d_1$ and ring 24, spaced axially from ring 22 and disposed generally at the center of the shaft 14 has a diameter $d_3$ that is less than diameter $d_2$. A ring 26 at end 28 of the shaft 14 has a diameter (such as a diameter of $d_1$) that is larger than diameter $d_3$ and a ring 30 between ring 24 and 26 has a diameter (such as a diameter of $d_2$) that is larger than diameter $d_3$ but less than diameter $d_1$. In the embodiment of FIG. 2, $d_1 > d_2 > d_3 > D$. The rings 16 act as cooling fins to provide convective heat rejection from the contact arm 11.

Thus, as shown, the diameters of the rings 16 gradually decrease from the first end 28 to generally the center of the shaft 14 near the front end 32 (FIG. 1) of the bushing structure 12, and then gradually increase to the second end 18 of the shaft 14 that extends outwardly from the front end 32 of the bushing structure 12. This ring structure reduces the electrostatic field stresses at the front end 32 of the bushing structure 12, which is the most likely point of flashover during the ANSI BIL testing. This improved contact arm 11 increases the flashover path length to grounded objects in the final switchgear assembly to the point of not needing current transformers with Mylar® linings and polycarbonate barriers.

The shaft 14 includes a plurality of bores 33 extending transversely with respect to the longitudinal axis X from the hollow low central portion 35 of the shaft 14 to the outer periphery (outer diameter D) thereof. The bores 33 permit air to enter the hollow portion 35 to cool the shaft 14.

Figure 3:
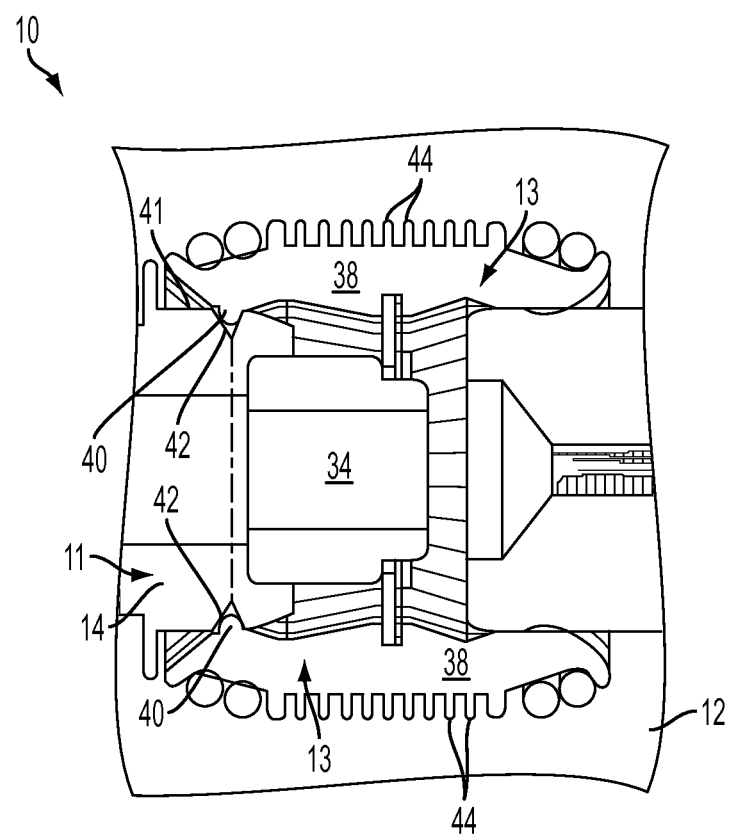
FIG. 3 is an enlarged view of contact fingers of the contact arm assembly of FIG. 1.

With reference to FIG. 3, a contact arm assembly 10 includes a support tube 34 that is coupled with the shaft 14 of the contact arm 11. The support tube 34 is hollow and communicates with the hollow shaft 14 to allow cooling air to flow there-through and thus through the center of the contact arm 11 to cool the interior of the assembly 10. Contact fingers, generally indicated at 13 are coupled to opposing sides of the support tube 34.

The contact area of high amperage (3000+) circuit breakers and switchgear contacts are the source of heat and temperature rise test failures. In accordance with the embodiment of FIG. 3, heat rejection surface area is maximized on the hottest component (the contact finger 13) to reduce the amount of heat generation. In particular, each contact finger 13 includes a body 38 and a ball member 40 extending from the body 38. As shown, the ball member 40 is in the form of a generally cylindrical plate, or semi-spherical member. An outer peripheral surface 41 of the shaft 14 of the contact arm 11 includes a preferably V-shaped socket or groove 42 therein that receives the ball members 40. The groove 42 is preferably defined by walls disposed at a 60° angle and the groove 42 is machined into the contact arm 11. This ball and groove structure generally doubles the contact surface area between the fingers 13 and contact arm 11 while maintaining the same contact pressure as contact fingers without this arrangement; given the load from a driving contact load applied. Additionally, the ball member 40 can be formed with the outline of the contact finger 34 without any secondary operation to complete the cylindrical, plate feature. In addition, a plurality of spaced, heat rejection fins 44 extends from a periphery of each body 38 and greatly increases the surface area of the contact finger, producing more heat rejection surface area on the hottest component of the assembly 10.

The contact arm assembly 10 allows for the misalignment requirements of switchgear circuit breakers. The relationship between the contact finger ball member 40 and the V-shaped groove 42 on the contact arm 11 develops the same contact pressure at each of the contact points (2 of points) as a single contact type finger with the same application force applied. The 60° angle of the walls of the V-shaped groove 42 to the ball member 40 develops the increased contact pressure on each side of the ball member 40.

The contact arm assembly 10 of the embodiment is configured for use in preferably 63 kA, 3000 Amp circuit breakers.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A contact arm assembly for a switchgear circuit breaker comprising:
   a contact arm having a groove in an outer peripheral surface thereof, and
   at least one contact finger, the contact finger having a body and a ball member extending from the body, the ball member being received in the groove so that the contact finger makes contact with the contact arm,
   wherein a plurality of heat rejection fins extends from a periphery of the body of the contact finger.

2. The assembly of claim 1, wherein the groove is a generally V-shaped groove and the ball member is a generally cylindrical or semi-spherical member.

3. The assembly of claim 2, wherein the V-shaped groove is defined by walls that form a 60° angle.

4. The assembly of claim 1, wherein the contact arm is hollow and the assembly further comprises a hollow support tube coupled to the contact arm, the contact arm and the support tube being constructed and arranged to permit cooling air to pass there-through.

5. The assembly of claim 4, wherein the contact arm has a plurality of bores extending transversely with respect to a longitudinal axis of the contact arm from a hollow portion of the contact arm to the outer peripheral surface to introduce air to the hollow portion of the shaft and thus to the support tube.

6. The assembly of claim 4, wherein a pair of contact fingers are coupled to the support tube.

7. The assembly of claim 1, wherein the contact arm includes a shaft having a longitudinal axis, first and second ends, and a substantially constant outside diameter D, and wherein a plurality of annular rings extend from the outside diameter of the shaft, the rings being spaced along the longitudinal axis to define cooling fins, diameters of the rings gradually decreasing from the first end to generally the center of the shaft, and then gradually increasing to the second end of the shaft.

8. The assembly of claim 7, wherein a first ring, disposed at the first end of the shaft, has a diameter $d_1$ and a second ring, spaced axially from the first ring, has a diameter $d_2$, and a third ring, spaced axially from the second ring and disposed generally at the center of the shaft, has a diameter $d_3$, and wherein a fourth ring, disposed at the second end of the shaft, has a diameter substantially equal to $d_1$, and a fifth ring, disposed between the fourth ring and the third ring, has a diameter substantially equal to $d2$, wherein $d_1 > d_2 > d_3 > D$.

9. The assembly of claim 8, further comprising a bushing structure, a portion of the shaft being disposed within the bushing structure such that the center of the shaft and the third ring are disposed generally at an inlet end of the bushing structure, with the second end being outside of the bushing structure.

10. A contact arm for a switchgear circuit breaker comprising:
    a shaft having a longitudinal axis, first and second ends, and a substantially constant outside diameter D, and
    a plurality of annular rings extending from the outside diameter of the shaft, the rings being spaced along the longitudinal axis to define cooling fins, diameters of the rings gradually decreasing from the first end to generally the center of the shaft, and then gradually increasing to the second end of the shaft.

11. The contact arm of claim 10, wherein a first ring, disposed at the first end of the shaft, has a diameter $d_1$ and a second ring, spaced axially from the first ring, has a diameter $d_2$, and a third ring, spaced axially from the second ring and disposed generally at the center of the shaft, has a diameter $d_3$, and wherein a fourth ring, disposed at the second end of the shaft, has a diameter substantially equal to $d_1$, and a fifth ring, disposed between the fourth ring and the third ring, has a diameter substantially equal to $d_2$, wherein $d_1 > d_2 > d_3 > D$.

12. The contact arm of claim 11, in combination with a bushing structure, a portion of the shaft being disposed within the bushing structure such that the center of the shaft and the third ring is disposed generally at an inlet end of the bushing structure, with the second end being outside of the bushing structure.

13. The combination of claim 12, in further combination with contact fingers within the bushing structure and constructed and arranged to engage the contact arm.

14. The contact arm of claim 10, wherein the shaft has hollow portion and has a plurality of bores extending transversely with respect to the longitudinal axis from the hollow portion to the outside diameter to introduce air to the hollow portion of the shaft.

15. A method of providing a heat rejecting contact arm assembly for a switch gear circuit breaker, the method comprising the steps of:
providing a contact arm having a shaft with a longitudinal axis, the shaft having first and second ends; a substantially constant outside diameter D; a plurality of annular rings extending from the outside diameter of the shaft, the rings being spaced along the longitudinal axis to define cooling fins, diameters of the rings gradually decreasing from the first end to generally the center of the shaft, and then gradually increasing to the second end of the shaft; and a groove in the periphery of the shaft,
assembling the contact arm in a bushing structure such that the center of the shaft is disposed generally at an inlet end of the bushing structure, and
providing a contact finger having a body and a ball member extending from the body, the ball member being received in the groove so that the contact finger makes contact with the contact arm.

16. The method of claim 15, further comprising:
providing a plurality of heat rejection fins extending from a periphery of the body of the contact finger.

17. The method of claim 15, wherein the shaft has hollow portion and has a plurality of bores extending transversely with respect to the longitudinal axis from the hollow portion to the outside diameter to introduce air to the hollow portion of the shaft.

18. The method of claim 15, wherein the groove is a generally V-shaped groove and the ball member is a generally cylindrical or semi-spherical member.

19. The method of claim 15, wherein the rings of the contact arm are provided such that a first ring, disposed at the first end of the shaft, has a diameter $d_1$ and a second ring, spaced axially from the first ring, has a diameter $d_2$, and a third ring, spaced axially from the second ring and disposed generally at the center of the shaft, has a diameter $d_3$, and wherein a fourth ring, disposed at the second end of the shaft, has a diameter substantially equal to $d_1$, and a fifth ring, disposed between the fourth ring and the third ring, has a diameter substantially equal to $d_2$, wherein $d_1 > d_2 > d_3 > D$.

* * * * *